United States Patent Office 2,849,209
Patented Aug. 26, 1958

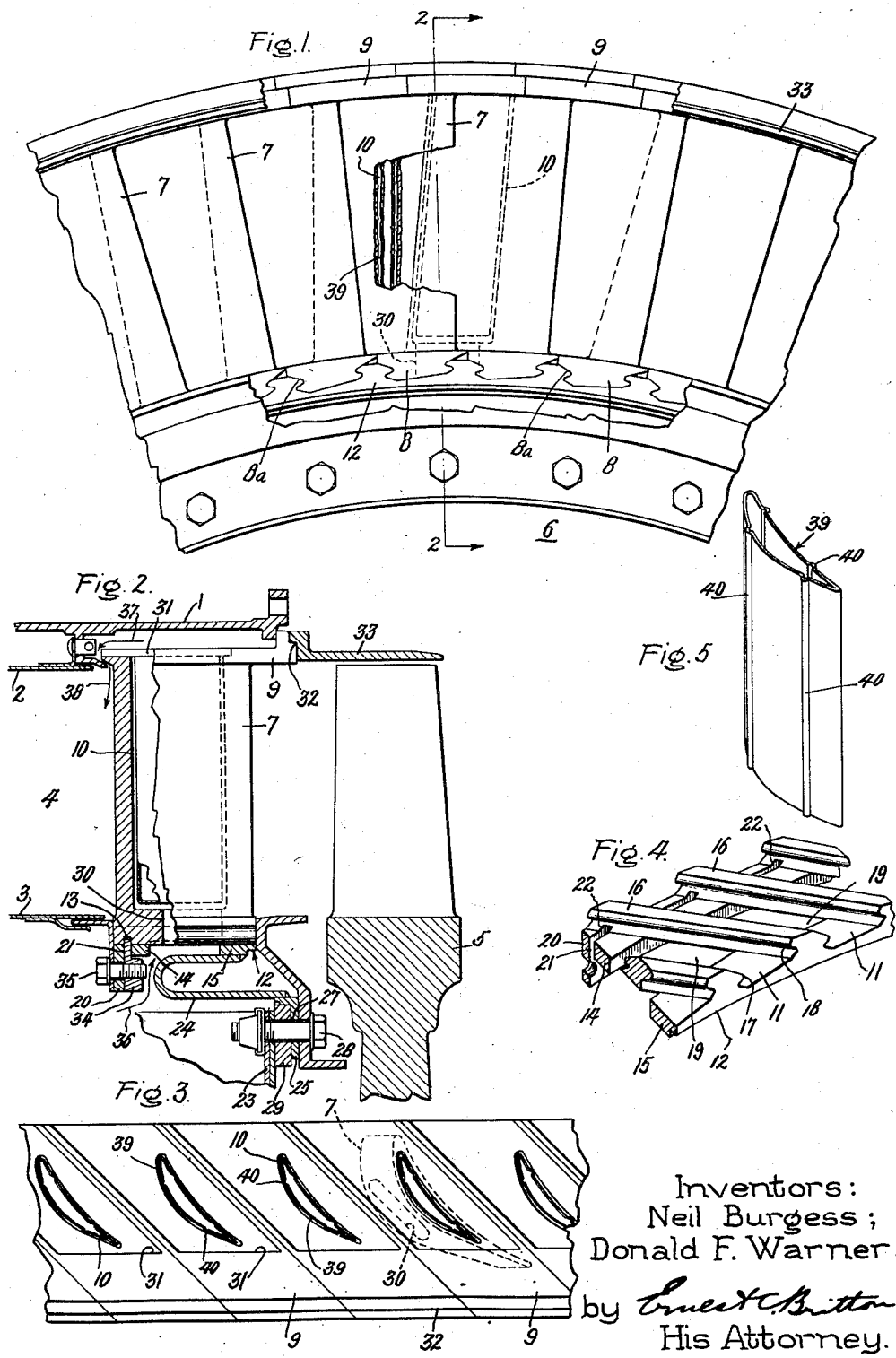

2,849,209

NOZZLE CONSTRUCTION FOR TURBINES

Neil Burgess, Melrose, and Donald F. Warner, Marblehead, Mass., assignors to General Electric Company, a corporation of New York Application October 11, 1950, Serial No. 189,562

6 Claims. (Cl. 253—39.1)

This invention relates to elastic fluid turbines for high temperature motive fluids and more particularly to an improved nozzle arrangement at the entrance to such a turbine.

The present invention is illustrated as embodied in a gas turbine powerplant and is concerned primarily with an improved nozzle construction which is disposed between the combustion chamber and the rotor in such a powerplant. The nozzle means and adjacent parts of a gas turbine powerplant are subjected to exceedingly high temperatures because the high temperature gases generated in the combustion chambers pass first through the nozzle means before entering the turbine rotor. It is, accordingly, desirable to make provision for cooling of the nozzle elements.

Furthermore, when the turbine is started or shut off, as well as during normal operation, differences in temperature will occur between the nozzle elements and the supporting means therefore. These differences in temperature, which may be considerable, are caused, for example, by non-uniform temperature distribution of the gas stream, more effective cooling of the external casing portions, and, during transient heating or cooling periods, due to differences in the mass of the elements of the nozzle means and of the supporting means therefore. These differences in temperature may cause excessive distortion and sometimes even failure of the nozzle elements.

Accordingly, it is an object of the invention to provide means for effectively cooling the structural elements of the turbine nozzle.

It is also an object of the invention to provide an improved nozzle arrangement wherein the nozzle elements are adequately supported and at the same time are permitted to expand or contract without distortion when subjected to extreme temperature variations.

A further object of the invention is in the provision of an improved nozzle arrangement wherein the nozzle elements are so arranged as to permit ease of manufacture, ease of replacement of damaged parts and in the making of repairs.

Still another object of the invention is in the provision of an improved nozzle arrangement wherein the nozzle support is shielded from direct contact with the hot motive fluid.

Other objects and advantages of the invention will be apparent from the following description taken in connection with the accompanying drawings forming a part of this specification, and in which Fig. 1 is a view, partly in section, of a portion of an improved nozzle arrangement in accordance with the invention; Fig. 2 is a view, also partly in section, looking in the direction of arrows 2—2 illustrating the nozzle and its relation to adjacent parts of a gas turbine; Fig. 3 is a partially developed view looking at the outer periphery of the nozzle and in a radially inward direction; Fig. 4 is a perspective view showing the arrangement for securing the nozzle blade elements; and Fig. 5 illustrates a means in accordance with one embodiment of the invention for causing cooling fluid to flow across the interior surfaces of the nozzle blade elements at high velocity.

A gas turbine powerplant may comprise a compressor, combustion chambers, and a turbine all arranged in series flow relation. Atmospheric air is drawn into the compressor and delivered under pressure to the combustion chambers. At this point fuel is added to the air and ignited. As a result of the combustion of the fuel in the air, the combustion chambers deliver fluid under pressure and at high temperature to the turbine which extracts at least sufficient energy from the fluid to drive the compressor and certain auxiliaries required for the operation of the powerplant. The energy remaining in the motive fluid is therefore available for the propulsion of the aircraft. Such a powerplant is desired with greater particularity in the patent to Streid, 2,432,359, and Howard Patents 2,479,573, and 2,711,074 assigned to the same assignee as the present application.

Referring now to the drawings, a casing portion of such a powerplant is indicated at 1 as supporting walls 2, 3 which form a transition passage 4 leading from the combustion chambers (not shown) to the turbine portion of such a powerplant. A turbine wheel or bladed rotor is indicated at 5.

Referring now to Figs. 1 and 2, a plurality of nozzles, indicated generally at 6 are interposed between passage 4 and the bladed rotor 5. Formerly, nozzle diaphragms for steam and gas turbines were of fabricated construction. The desired cross-section was determined for several radial locations along the length of the nozzle blade sections, and the individual blade elements were either machined from solid stock or forged directly to the desired shape. Punched inner and outer annular bands formed the inner and outer peripheral portions of the nozzle diaphragm. These bands usually were made of relatively thin plate stock which were punched to provide a plurality of openings corresponding to the number of blade sections and corresponding approximately to the shape of the end portions thereof. These flat sections of plate stock were then rolled to form the inner and outer bands, the respective end portions of each of the flat plate sections being joined by welding to form the annular inner and outer rings. The blade sections were then inserted into the respective openings and the end portions of each blade section were welded to the inner and outer rings, respectively. It will be apparent that nozzle means constructed in the above described manner formed a relatively rigid unitary structure which was supported within the turbine by the inner and the outer bands wherever possible.

It is an important feature of the present invention that individual blade sections are supported at their inner end portion only, and the complete nozzle means does not form a unitary structure. This is accomplished in accordance with the invention by the provision of individual blade sections 7 having a "foot" or platform 8, 9 at each end thereof. Each blade section is provided with a hollow portion or passageway 10 extending therethrough in order to allow cooling fluid to be supplied to each blade section. The blade sections 7 are cast to their final shape so that the only machining required is on the "foot" or platform sections 8, 9. It will, of course, be recognized by those skilled in the art that the individual blade sections 7 can be made by other means, for example, by forming the airfoil portion of the blade of relatively thin sheet metal and welding the "foot" or platform portions 8, 9 thereto.

The blade sections 7 are secured at their inner end portions only by a dovetail machined in the inner foot or platform 8. The dovetails 8a of the individual blade sections are received into a plurality of dovetail slots 11 provided in an annular support member 12. The dovetails 8a, slots 11, and annular support member 12 are best shown in Figs. 1 and 4. Each dovetail 8a has provided therein a radially and circumferentially extending slot 13, best shown in Fig. 2. The purpose of slot 13 will appear as the description proceeds.

Referring now to Fig. 4, it will be noted that annular support ring 12 is formed in such a manner as to comprise a pair of axially spaced annular members 14, 15 connected by axially and circumferentially extending connecting portions 16. Sides 17, 18 of axially and circumferentially extending portions 16 are machined to mate with the dovetail portions 8a and thus form the sides of slot 11. It will also be noted that this construction forms a plurality of spaced openings 19 between spaced annular members 14, 15 and between adjacent axially and circumferentially extending connecting members 16. The end portion of annular member 14 forms a flange 20. A circumferentially extending slot 21 is machined between annular support member 14 and flange 20 and slot 21 extends sufficiently far in a radial direction to completely separate annular member 14 and flange portion 20 and extends partly into axially and circumferentially extending connecting members 16 and is best indicated at 22. The purpose of openings 19 and slot 21 will also appear as the description proceeds.

Referring now to Fig. 2, annular support member 12 is supported by a fixed support member 23 within the turbine casing. This is accomplished by the provision of a connecting cantilever support member comprising a U-shaped member 24 and a flange portion 25. Flange 25 is connected to U-shaped member 24 and U-shaped member 24 is connected to portion 15 of annular support member 12 by welding, but it will be obvious to those skilled in the art that these members may be secured together by any means which may be convenient. Flange portion 25 is provided with a plurality of circumferentially spaced openings 27 to permit the nozzle support assembly to be secured to support member 23 by threaded fastenings 28. Still referring to Fig. 2, a shim 29 is indicated between support member 23 and flange portion 25. By changing the thickness of shim 29 it will be obvious that the axial spacing between the nozzle blades 7 and the bladed rotor 5 can be controlled to any desired value.

As previously indicated the central portion of blade sections 7 is provided with an opening or passageway 10 extending therethrough. A similar passageway 30 extends through the "foot" or platform 8 and communicates with passageway 10. In a similar manner, passageway 31 is provided in "foot" or platform member 9 and is in communication with passageway 10. The right-hand end portion of "foot" or platform 9 is provided with a rabbeted portion 32 which serves as a locating means for turbine shroud member 33.

In assembling our improved nozzle means, individual blade 7 is assembled in annular blade support member 12 by inserting the dovetail portions 8a into slots 11. When the blades 7 are in proper relation with respect to support member 12, slot 13 will be in radial register or matching with slot 21. The blades are locked in position by a plurality of arcuate members 34 which engage slots 13 and 21 and which are secured to flange member 20 by threaded fastenings 35. When all of the blade sections have been secured to support member 12, the entire assembly is then ready for installation in the turbine by securing flange portion 25 to support member 23 by threaded fastenings 28.

It is important to note that when the dovetail portions 8a of blade 7 are secured to support member 12 in the manner hereinabove described, the passageways 30 of each blade foot 8 register with one of the openings 19 which are formed between spaced annular ring members 14, 15 and connecting members 16 of support member 12. When the complete nozzle means is installed and secured to support member 23, as illustrated in Fig. 2, cooling fluid, for example, air under pressure and furnished by the compressor portion of a gas turbine powerplant, is supplied to the region adjacent to the U-shaped member 24 as indicated by arrow 36. The cooling fluid under pressure flows in the direction indicated by arrow 36 through opening 19, then through passageway 30 and into the hollow portion 10, and is finally discharged through passageway 31. Upon being discharged from passageway 31, the cooling fluid flows in the space defined between the platforms 9 and the inner surface of casing 1, as indicated by arrow 37, and is finally discharged into passage 4 as indicated by arrow 38. Thus it will be apparent that any air which may have been bled from the compressor portion of the gas turbin powerplant to serve as coolant does not represent a total loss as far as powerplant performance is concerned, since this air not only serves to cool the blade sections 7, but is ultimately mixed with the hot gases supplied to the turbine portion of the powerplant before these gases reach the nozzle means so that the coolant fluid also passes through the turbine and useful work is extracted therefrom.

In order to obtain more effective heat transfer from the blade section 7 to the coolant, it may be desirable to increase the velocities of the coolant fluid through the passageway 10 of blade section 7 to a relatively high value consistent with good heat transfer conditions. This is accomplished in accordance with the invention by the provision of a plug member which is inserted into passageway 10 thus decreasing the effective flow area therethrough with an attendant increase in the velocity of the coolant fluid. Obviously, many different kinds of plug members will suggest themselves to those skilled in the art. One relatively simple way of providing such a plug is to form a relatively thin structure of sheet metal which is closed at one end and formed to the approximate dimensions of internal passageway 10. Such a plug is illustrated at 39, Fig. 5. It will be noted that the plug structure is hollow. After the forming operations are complete, individual plugs 39 are inserted in each of the hollow passageways 10 of the respective blade section 7. The open end portion of the plug structure is then connected to a source of fluid under relatively high pressure (not shown), for example oil or air. The pressure of the fluid is then increased sufficiently to cause permanent deformation of the relatively thin wall structure of the plug 39 so that it engages at various points, the inner wall of passageway 10. The rib portions 40 of plug 39 engage the inner wall surfaces of passageway 10 and thus prevent the remaining portions of the plug from collapsing against the inner wall surfaces of passageway 10. Thus, a plurality of relatively narrow fluid passageways are defined by the walls of plug 39 between adjacent ribs thereof and the inner wall surfaces of hollow passageway 10. After plugs 39 have been permanently deformed either by hydraulic or by pneumatic means as described above, the ribbed portions 40 will engage the inner walls of passageway 10 with sufficient force to hold the plug 39 in position. Even if, during operation, due to vibration or the action of the cooling fluid flowing past plug 39 at relatively high velocity, the plug tends to loosen in passageway 10, no great harm will be done since the plug will be prevented from leaving passageway 10 by outer casing 1. With plugs 39 inserted in each of blade sections 7, it will be seen that the inner surfaces of passageway 10 and the outer surfaces of plug 39 between adjacent rib portions form a plurality of small passageways through which the coolant is forced to flow at high velocity for good heat transfer.

Thus it will be seen that in our improved nozzle construction there is adequate provision for expansion of the nozzle components under the effect of relatively high temperature differentials without distortion since the blade sections are secured at their inner ends only. Furthermore, in our improved nozzle construction, the blade sections are fitted relatively loosely into the dovetail slots so that replacement of individual sections in the event of damage is greatly facilitated, adequate cooling is provided for individual blade sections, and, by making the circumferential length of foot portion 8 substantially equal to 1/n of the perimeter p of annular member 12, where n stands for the number of blade sections, the inner "foot" shields the annular support member 12 from direct contact with the hot gases, as is clearly indicated in Fig. 1, thus protecting said member from excessive heat and/or distortion.

While a particular embodiment of the invention has been illustrated and described, it will be obvious to those skilled in the art that many changes and modifications may be made without departing from the invention, and it is intended to cover in the appended claims all such changes and modifications that come within the true spirit and scope of the invention.

What we claim as new and desire to secure by Letters Patent of the United States is:

1. A nozzle diaphragm for a turbomachine comprising a plurality of individual hollow nozzle blade members each having a platform portion at one end thereof, the other end portions of said blade members having a circumferential, radially extending slot on their inner sides, an annular support member having a similar radially extending slot in radially aligned juxtaposition relation with said slots in said blade members, a fixed support, and means for securing said blade members at said other end portions to said support member including a plurality of equally spaced, substantially parallel, exterior slots in said support member receiving said individual blade members therein, a cantilever support connecting said support member with said fixed support, and locking means in engagement in said radially extending slots, said blade members being equally spaced around the periphery of said support member to form a plurality of similar fluid passages between adjacent blade members, said platform end portions being supported by their respective blade members and forming an outer boundary for said fluid passages.

2. A nozzle diaphragm for a turbomachine comprising a plurality of individual nozzle blade members, an annular support member having a plurality of dovetail slots on its exterior surface, dovetail means at one of the ends of said blade members securing said blade members to said support member, a fixed support, a cantilever support connecting said support member with said fixed support, said blade members extending in a generally radial direction and with adjacent blade members when assembled in said dovetail slots forming a plurality of similar fluid passageways, each of said dovetail means having a circumferential, radially extending slot on the inner periphery thereof, said support member having a corresponding slot in radially aligned juxtaposition relation with the dovetail radial slots, and means engaged in said slots for locking said blade members to said support member against axial movement.

3. A nozzle diaphragm in accordance with claim 2 wherein said nozzle blade members are provided with the dovetail means having a circumferential length substantially equal to p/n, where p is the perimeter of said annular support member and n is the number of blade members, and having an axial length at least equal to the axial length of said support member, whereby said support member is insulated by said dovetail portions from direct contact with high temperature fluid which may flow through said passageways.

4. A nozzle diaphragm for turbomachines comprising a plurality of individual nozzle blade members each having a dovetail at one end and a passageway extending therethrough and a circumferential radially extending slot in the inner end portion thereof, an annular support member having a plurality of equally and circumferentially spaced coolant conducting openings therethrough and an inner radially extending slot, part of which is in radially aligned juxtaposition relation with the slots in said blade members when in assembled relationship therewith, each of said openings being in register with one of said passageways, a fixed support, a cantilever support connecting said support member with said fixed support, dovetail means in said support member cooperatively engaged with said blade member dovetails for securing said blade members to said support member, and means engaged in said slots for fixing said blade members against axial movement in said support member.

5. Nozzle apparatus for a turbomachine comprising a plurality of individual blade members each having a passageway extending therethrough and having a platform member at one end and a dovetail portion at the other end thereof, each portion having a circumferential, radially extending slot on its inner periphery, an annular support member having a plurality of equally spaced dovetail slots in the outer periphery thereof and having a plurality of coolant conducting openings extending through said support member into said slots and having a radially aligned juxtapositioned slot similar to the radially extending slots in said blade members, a fixed support, a cantilever support connecting said support member and said fixed support, means engaged in said radially extending slots for securing said dovetail portions in said dovetail slots on said support member with said blade members extending in a generally radial direction and with each of said passageways in register with one of said openings.

6. In combination with a turbomachine including a rotor, conduit means for supplying motive fluid under pressure and at a high temperature to said rotor, nozzle means within said conduit means comprising a plurality of individual blade sections each having a passageway extending therethrough, a platform member at one end and a dovetail portion with a circumferential groove at the other end thereof, said groove extending radially on the inner periphery of each dovetail portion, an annular support member having a plurality of equally spaced dovetail slots on the outer periphery thereof cooperatively engaged with said blade section dovetail portions with coolant conducting openings extending through said member and communicating with said slots, said plurality of slots being equal in number to said plurality of blade sections, said support member having a radial groove part of which is in radially aligned juxtaposition relation with the circumferential grooves on the blade sections when in assembled relationship therewith, a fixed support, a cantilever support connecting said support member and said fixed support, means engaged in said radial grooves for securing said sections against axial movement in said dovetail slots on said support member with said blade members extending in a generally radial direction and with each of said passageways in register with one of said openings, and casing means surrounding said platform members and defining therewith a passageway connecting the passageway of the individual blade sections with said conduit means at the upstream side of said nozzle means.

References Cited in the file of this patent

UNITED STATES PATENTS

| | | |
|---|---|---|
| 1,266,973 | Metten | May 21, 1918 |
| 2,279,258 | Allen et al. | Apr. 7, 1942 |
| 2,417,486 | Hagemann et al. | Mar. 18, 1947 |
| 2,488,875 | Morley | Nov. 22, 1949 |

(Other references on following page)

UNITED STATES PATENTS

| | | |
|---|---|---|
| 2,559,131 | Oestrich et al. | July 3, 1951 |
| 2,585,871 | Stalker | Feb. 12, 1952 |
| 2,625,793 | Mierley | Jan. 20, 1953 |

FOREIGN PATENTS

| | | |
|---|---|---|
| 107,788 | Sweden | June 29, 1943 |
| 341,486 | France | June 11, 1904 |
| 602,530 | Great Britain | May 28, 1948 |

OTHER REFERENCES

"Flight," May 4, 1950, vol. LVII, Issue 2158, page 544.